United States Patent

Wilson

[15] 3,639,876

[45] Feb. 1, 1972

[54] PROBE BODY FOR CORROSION TESTS

[72] Inventor: Homer M. Wilson, Houston, Tex.

[73] Assignee: Petrolite Corporation, St. Louis, Mo.

[22] Filed: July 28, 1970

[21] Appl. No.: 58,891

Related U.S. Application Data

[62] Division of Ser. No. 764,884, Oct. 3, 1968, Pat. No. 3,558,462.

[52] U.S. Cl. ............................338/13, 73/86, 23/230 C, 23/253 C, 174/152 GM
[51] Int. Cl. ...................................B01k 3/00, H01c 7/00
[58] Field of Search .....................23/239 C, 253 C; 73/86; 204/1 T, 195 C, 286, 297; 324/65 C, 65 CR, 71 C, 29; 338/13; 339/95 A, 126, 130, 144, 146, 195, 196

[56] References Cited

UNITED STATES PATENTS

| | | | |
|---|---|---|---|
| 2,508,551 | 5/1950 | Sykes | 174/152 GM |
| 3,080,747 | 3/1963 | Kerst | 73/86 |
| 3,406,101 | 10/1968 | Kilpatrick | 204/195 C |

FOREIGN PATENTS OR APPLICATIONS

| | | | |
|---|---|---|---|
| 35,320 | 4/1935 | Netherlands | 339/196 R |

Primary Examiner—Marvin A. Champion
Assistant Examiner—Lawrence J. Staab
Attorney—Emil J. Bednar and Sidney B. Ring

[57] ABSTRACT

A metallic probe body formed of a pipe plug with an upper cylindrical cavity intersected by lower passageways carrying insulating members. Metallic terminal pins extend through these members for mounting field-replaceable electrodes in a side-by-side relationship. An electrical fitting is secured to the top portion of the plug for enclosing the cavity. Electrically conductive means in the cavity interconnect the electrical fitting and the pins. The conductive means are insulated from one another and the probe body. The probe body may be readily installed in any piping system carrying corrosive fluids without introducing any weakness into such piping. The pipe plug subcomponent of the probe body can be manufactured by available pipefitting techniques.

10 Claims, 5 Drawing Figures

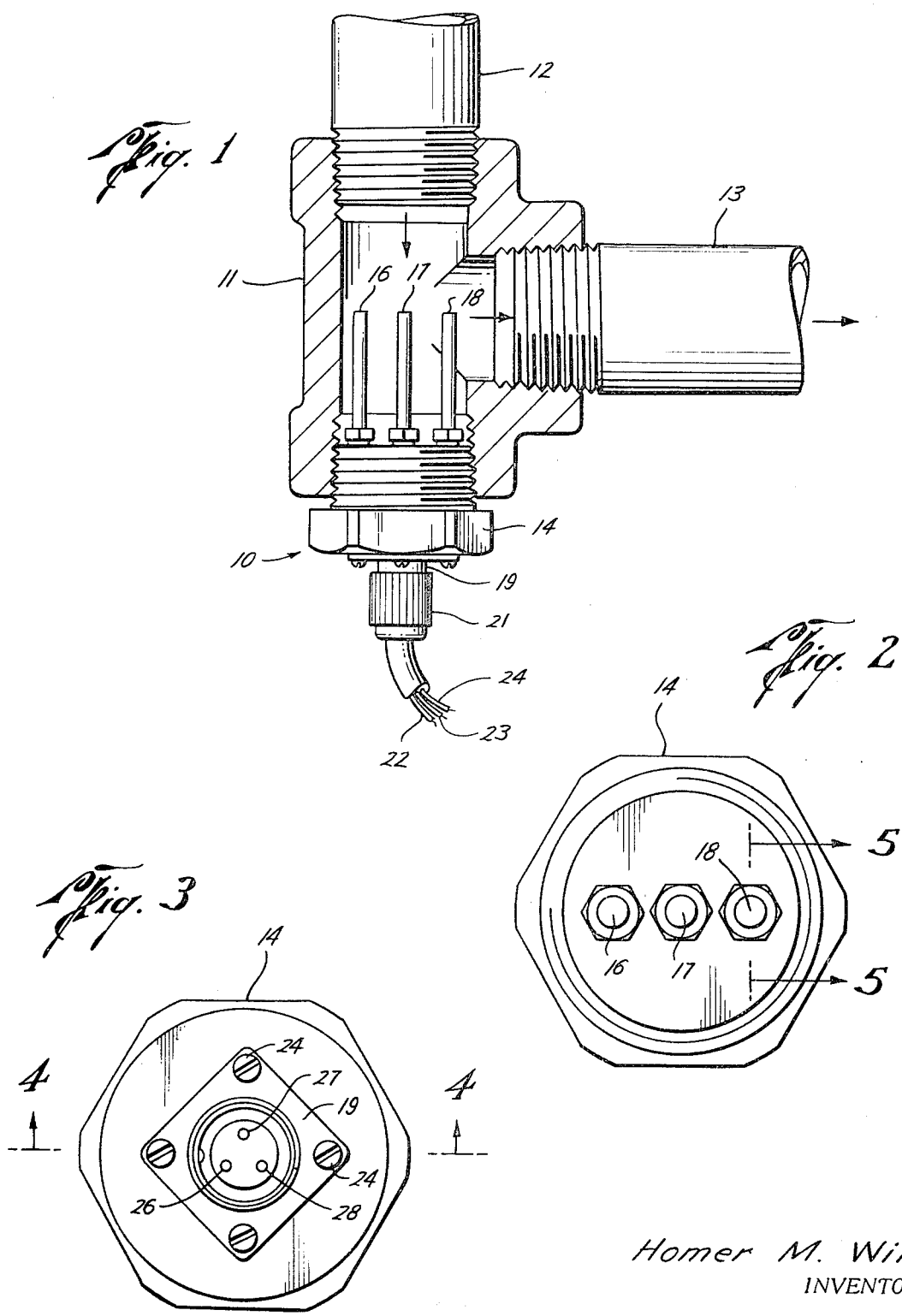

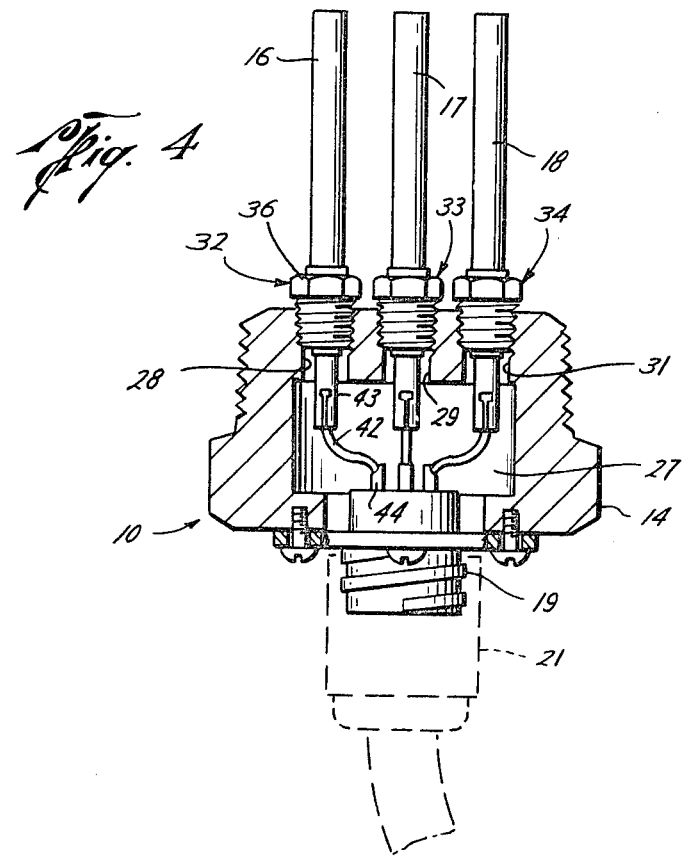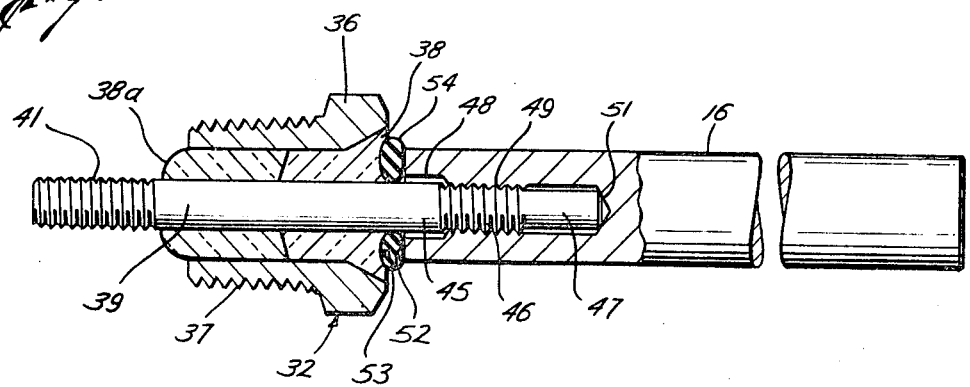

PROBE BODY FOR CORROSION TESTS

This is a division of application Ser. No. 764,884, filed Oct. 3, 1968, and now U.S. Pat. No. 3,558,462.

BACKGROUND OF THE INVENTION

1. Field of the Invention

This invention relates to measuring and testing of corrosion processes, and it relates more particularly to the instruments and electrochemical techniques used in the study of corrosion processes.

2. Description of the Prior Art

It is often desirable to determine the rates at which metals corrode within a corrosive liquid. For example, corrosion inhibitors are added to aqueous liquids to reduce the corrosion of exposed metals. Instruments are used to measure the rates at which these metals corrode so that the effectiveness of the inhibitor can be determined. The measurement of the rate of corrosion upon metals usually involves an instrument associated with a probe which carries a plurality of electrodes immersed within the corrosive liquid. In refineries, petrochemical plants, and other process industries using large volumes of aqueous fluids, the probes are usually installed within the piping system carrying the fluid desired to be monitored. Additionally, probes have been placed in other uses, such as monitoring the rate of corrosion of metals forming oil field pipelines containing waters that are employed to stimulate oil production from subterranean reservoirs.

The probes must be readily interconnected into the piping system carrying aqueous fluids so that their electrodes are exposed to the corrodent. Whatever the construction of the probes, their placement into the piping must not create a weakness. For example, probes using plastics for providing insulating functions are not universally acceptable. One reason for this result is the chemical and physical attack in certain aqueous systems upon various plastic materials. The probe may be subject to aqueous systems containing various corrodents and plastic destroying organic contaminants at pressures up to 15,000 p.s.i. and temperatures which can reach 400° F. Under these operating conditions, the probe must not introduce a weakness due to its construction into the piping system. A failure of the probe, by leakage or blowout, can cause a severe economic loss when the piping system provides an essential processing link. Under these circumstances, the entire process must be temporarily interrupted while the probe is being replaced.

In many instances, the probe will be installed within a "-bypass" piping circuit so that it can be readily removed. This arrangement permits the field replacement of its electrodes. The field replacement of electrodes in a probe is a great advantage. The probes' electrodes may be replaced to eliminate effects of previous corrosion or exposure to inhibitors. Additionally, the electrodes may be examined to measure the actual weight loss suffered during exposure to the corrosive aqueous medium. However, The exact same surface area exposure must be maintained between electrodes interchanged on the probe. Otherwise, the probe assembly must be recalibrated to insure consistent results in the measurement technique after each replacement of electrodes. The electrodes will be changed in the field, usually by nontechnical personnel. Therefore, the changing of the electrodes cannot require sophisticated measurement or replacement techniques. For example, the exposed surface areas of the electrodes cannot depend upon making a certain measured engagement relative to a mounting or sealing surface.

In addition, the probe assembly itself must not require special handling, placement or tools not normally required in maintaining the piping system. Preferably, the probe assembly looks and is handled like a regular pipefitting. The probe assembly should not contain any material (other than possibly the electrodes) which is more corrodible in the aqueous fluid than the piping system. Thus, the probe cannot be the weakest link in the piping system.

The probe assembly usually employs a plurality of electrodes which are insulated from one another and the pipe system. Generally, the electrodes are metals and have identical surface areas exposed to the corrodent. The electrodes in a corrosive liquid undergo certain electrochemical changes that are related to rates of corrosion of the specific metals. Thus, the rate of corrosion can be correlated with the electrochemical effects upon the metallic electrodes of a probe assembly immersed in the corrosive liquid.

An electrochemical process and apparatus especially useful in measuring corrosion rates is described in application Ser. No. 332,399 which was filed Dec. 23, 1963 and now is U.S. Pat. No. 3,406,101. In this technique, there is employed a corrosion rate meter which includes a probe having three electrodes adapted to be exposed to a corrosive liquid, an adjustable current source, an ammeter and a high impedance voltmeter as primary components. The adjustable current source applies a small electric current between a "test" electrode and an "auxiliary" electrode. At the same time, the volt meter monitors the polarization potential between the "test" electrode and a "reference" electrode. The current flow slightly polarizes the surface of the "test" electrode, and as a result, causes a shift in the potential between the "test" and "reference" electrodes. The current flow required to produce 10 millivolts polarization is directly proportional to the corrosion rate the the "test" electrode undergoing corrosion.

If the corrosion rate is low, a very small current flow will polarize the "test" electrode. If the corrosion rate is high, much more current flow is required to polarize the electrode. The weight of metal loss from the electrode (by electrochemical corrosion) is directly proportional to the current flow in accordance with Faraday's Law. Thus, by use of appropriate constants and adjustments of the exposed surface area of the "test" electrode, the ammeter can be calibrated directly into any desired units of corrosion rate providing the surface area of the "test" electrode is kept constant.

Obviously, the initial surface area of the electrode exposed to the corrosive liquid can be adjusted into the desired range. In order to provide symmetry of the probe, and for other reasons, the exposed surface areas of all electrodes are made identical. Thus, if the electrodes are constructed of the same material, such as 1020mild steel, any of the electrodes may serve as the "auxiliary," "test" and reference-type electrode in electrochemical techniques for determining the rate of corrosion.

Although the probe can be manufactured with certain identical exposed surface areas of the electrodes, the corrosive liquid causes the exposed surfaces to become pitted and otherwise damaged. Eventually, the probe must be either discarded, or the electrochemical technique recalibrated for the new characteristics which the electrodes have assumed. Usually the latter occurrence is avoided by substituting a new probe or replacing the electrodes. The probe can be removed and the electrodes refinished to provide a clean, fresh surface exposed to the corrosive liquid. However, the electrodes now will have a different exposed surface area than for which the probe was originally calibrated. Thus, a recalibration is required to maintain the ammeter of the corrosion meter calibrated directly in units of the corrosion rate.

It is the purpose of this invention to provide a test probe assembly which can be readily installed in piping systems without introducing a weakness there into or one requiring special piping techniques. Additionally, the electrodes on the probe assembly can be readily replaced by nontechnical personnel without requiring recalibration of the corrosion measurement technique. Thus, the corrosion meter used with the probe assembly will maintain its calibration directly in the units of corrosion rate for which is originally calibrated regardless of repeated electrode replacements.

SUMMARY OF THE INVENTION

In accordance with this invention, there is provided a probe body for a corrosion test probe assembly. The body comprises a metallic pipe plug with a top portion of a polygonal configuration and a lower cylindrical portion having a threaded exterior surface. A cavity extends through the top portion to adjacent the lower portion of the plug. Parallel passageways extend through the bottom portion of the plug into communication with the cavity. Insulating members are secured within each passageway. A metallic terminal pin extends centrally through each insulating member. A multiconnector electrical fitting is secured to the top portion of the plug to enclose the cavity. The pins and fitting are connected by electrical conductors and insulated from the plug. The pins which extend from the insulating members exteriorly of the plug carry threaded portions whereby an electrode may be secured to each pin and with fluid seal means engaged in fluid tightness between presented end surfaces of said insulating member and electrode.

BRIEF DESCRIPTION OF THE DRAWINGS

FIG. 1 is a prospective view, partially in cross section, of the probe assembly using the probe body of this invention installed within a tee of a conventional piping system.

FIG. 2 is an enlarged bottom (fluid-side) view of the probe assembly shown in FIG. 1;

FIG. 3 is an enlarged top (atmospheric-side) view of the probe assembly shown in FIG. 1;

FIG. 4 is an enlarged view, partially in cross section taken along line 4—4 of the probe assembly shown in FIG. 3;

FIG. 5 is an enlarged view partially in cross section taken along line 5—5 of one electrode and associated elements of the probe assembly shown in FIG. 2.

DESCRIPTION OF SPECIFIC EMBODIMENTS

In FIG. 1, there is illustrated one embodiment of a corrosion test probe assembly 10 which is secured within a tee 11 forming an interconnection between pipes 12 and 13 in a piping system carrying aqueous fluids whose corrosive effect is desired to be determined. The piping system dimensions are uncritical to the present invention, but for illustration, the pipes 12 and 13 may be of 2 inch internal diameter. The aqueous fluids flow through the piping system in a direction shown by the arrows. The probe assembly 10 is comprised of a metallic body 14 on which are carried replaceable electrodes 16, 17 and 18. These electrodes are interconnected within the body 14 by insulated electrically conductive means to a multiconnector electric fitting 19 carried on top of the body 14. Electrical connection to a corrosion rate meter (not shown) is by a cable connector 21 interconnecting conductors 22, 23 and 24 to the electrodes 16, 17 and 18, respectively, of the probe assembly 10.

The probe assembly 10 can be constructed of any suitable form so that it can be readily secured to the piping system carrying the aqueous fluids to be monitored. Preferably, the body 14 is constructed from a metallic pipe plug compatible with the piping system. Thus, the top portion of the body 14 has a polygonal configuration and a lower cylindrical portion having a threaded exterior side surface.

Referring to FIG. 2, the electrodes 16, 17 and 18 extend longitudinally from the bottom of the body 14 in side-by-side relationship. It is preferred for better measurements, to mount the electrodes diametrically aligned along the bottom of the body 14 rather than in a triangular or other relationship where electrical coaction between the electrodes occurs in the corrodent.

Referring to FIG. 3, the multipin fitting 19 is secured by means of screws 24 to the top of the body 14. The electrodes 16, 17 and 18 are electrically connected to the pins 26, 27 and 28, respectively, in the fitting 19. There are no exposed electrical connections between the electrodes and the fitting 19. As a result, the probe assembly 10 can be handled as another pipe fitting during installation.

The construction of the probe assembly 10 can be seen in greater detail in FIG. 4. The body of 14 carries external threads 26 which are adapted to interengage with the interior threads in the tee 11. A cavity 27, preferably cylindrical, is provided from the top of the body 14 to a region adjacent the lower cylindrical portion carrying the threads 26. The configuration of the cavity 27 is unimportant other than in providing sufficient room in which to accommodate the electrical connections between the electrodes and fitting 19. The lower portion of the body 14 is provided with a plurality of paralleled passageways 28, 29 and 31. The passageways are threaded, at least in part, to receive insulating members 32, 33 and 34 to which the electrodes are secured. Since the insulating members are identical, only insulating member 32 will be described in detail.

The insulating member 32, as seen in FIGS. 4 and 5, is provided by an exteriorly threaded metallic sleeve 36 which carries threads 37 to interengage with the threads in the passageway 28. The sleeve 36 may carry a polygonal external surface that is readily engaged by various pipe tools as can be best seen by momentary reference to FIG. 2. A glass element 38 is secured against displacement by compression and a flared shoulder within the sleeve 36. A metallic pin 39, extends centrally of the insulating member 32 and in fluidtightness through the glass element 38. The glass element 38, sleeve 36 and pin 39 are sealed in fluidtightness by fusion. Thus, the glass element 38, pin 39 and sleeve 36 are formed with glass-to-metal seals. The end of the pin 39 within the cavity 27 is provided with a thread 41, or other attaching surface, onto which electrical connection may be made. More particularly, electrical conductor 42 is secured to the threads 41 by terminal clip 43. The other end of the conductor 42 is secured to a terminal lug 44 which is electrically common to the pin 26 of the fitting 19. The electrical connections between the electrodes 17 and 18 through the insulating members 33 and 34 are made in identical manner.

The electrode 16 is releasably secured to the pin 39 in any convenient manner. Preferably, the interconnection is by threads so arranged that a positive electrical and mechanical connection is made while also providing a fluidtight seal between the electrode 16 and the glass element 38. For this purpose, the pin 39 is cylindrical with a full diameter portion 45 adjacent the glass element 38, an intermediate threaded portion 46 and a reduced diameter portion 47. The electrode 16 has an axial bore 48 formed into one of its ends which carries a seal engaging surface. The bore 48 has a reduced diameter threaded portion 49 which interengages with the threaded portion 46 of the pin 39. The bottom of the bore 51 has an abutting surface to engage a complementary surface upon the end of the reduced diameter portion 47 of the pin 39. Thus, the electrode 16 is threaded upon the pin 39 until a metal-to-metal contact occurs between the abutting surfaces on the pin 39 and the bore 48 of the electrode 16. A space is provided between the presented faces 52 and 53 of the electrode 16 and the glass element 38, respectively, by the length of the full diameter portion 45 with the electrode 16 and pin 39 in abutting relationship. The space between the presented faces 52 and 53 provides a precise dimension in which to receive an insulating fluid seal 54 into fluidtight engagement. Although any type of fluid seal may be employed, it is preferred to employ an 00ring formed of Viton (trade name). The seal 54 encircles the pin 39 and is compressed within the precise space distance to serve effectively as a pressure seal. The seal 54 keeps certain corrosive fluids from causing bimetallic contact corrosion along the threaded joint between pin 39 and electrode 16. Thus, the electrode 16 does not need to be threadedly adjusted on the pin 39 to place the fluid seal 54 into a certain compression. The metal-to-metal abutment between the pin and electrode, and the precise space thereby provided, create the sealing function.

The electrodes 17 and 18 use identical structures for their mounting upon the insulating means 33 and 34 as has been described for electrode 16.

It will readily be seen that the probe assembly 10 may be placed as would an ordinary pipe plug into piping systems without depending upon plastics, or other types of deteriorating seal materials to prevent leakage of corrosive fluids. The arrangement of the insulating member 32 with the glass element 38, provides an excellent fluid seal which is mechanically strong. The hermetic properties of this arrangement depend upon a fusion between the glass element 38, the sleeve 36 and the pin 39, plus a certain control compression created by the differential shrinkage of the sleeve 36 about the glass element 38. The glass element 38 need not extend substantially the depth of the sleeve 36. The glass element 38 may extend only partially into the sleeve 36 with the remaining opening about the pin 39 filled with a glass sleeve 38a which is held in place by a cementatious material. The function of the glass sleeve 38a is merely to fill an opening onto which moisture or debris may otherwise accumulate. The upstream placement of the glass element 38 provides the necessary mechanical and electrical functions within the insulating member 32.

In the insulating member 32, the sleeve 36, the glass element 38 and the pin 39 are arranged of suitable materials that have compatible coefficients of expansion and that provide the desired hermetic seal by fusion and compression properties. Additionally, the glass element 38 has significant structural strength, good chemical resistance and excellent electrical properties. The glass element 38 is relatively insensitive to thermal and mechanical disruption. Thus, the probe assembly 10 does not depend on polymeric plastics to provide either mechanical or electrical functions. The glass element 38 is capable of withstanding substantial amounts of fluid pressure under rigorous operating conditions.

The body 14 may be replaced, with or without new electrodes, whenever leakage occurs in any threaded joint.

The body 14 may be replaced, with or without new electrodes, whenever leakage occurs in any threaded joint.

The electrodes employed with the body 14 are of special utility since they can be readily replaced as often as is desired without changing the accuracy of corrosion rate determinations. Since one end surface of each electrode is always sealed against the seal 54, essentially dimensionally and surface smooth identical metallic electrodes provide substantially identical exterior side surface areas exposed to the aqueous medium. The electrodes are formed by common manufacturing techniques from a cylindrical rod which is given smooth exterior side and imperforate end surfaces. For example, a rough cylindrical rod is machined by turning, boring, and threading into the properly dimensioned electrode. Then, the electrode (with machined-marked surfaces) is provided a satinlike smooth finish by peening with glass beads projected at a high velocity upon the machined surfaces. The peening is sufficiently thorough that the actual and mathematically derived surface areas are substantially identical within the calibrated accuracy of the polarization measurement. Thus, the electrodes, may be readily exchanged in the probe assembly 10 without requiring recalibration of the corrosion rate meter with which the probe assembly is associated.

The electrodes especially suited for use in the probe assembly 10 may be constructed of any suitable conductive material. Preferably, the electrodes are fabricated from 1021 mild steel. Although steel has been proved suitable for use as a reference electrode in the present corrosion test probe assembly, the theory of the technique indicates that other materials and metal alloys may be employed. Materials such as iron, aluminum, copper, brass, lead, nickel, titanium, tantalum, zirconium, chromium and alloys thereof may be used under similar conditions. The use of steel is preferred for the electrodes. However, corrosion rates may be determined in a shorter test period at higher temperatures and pressures with the electrodes formed of other materials. Electrodes constructed of the same material are an advantage since all the electrodes respond identically to the corrosive liquid in which the corrosion rate test is being performed.

Various modifications and alterations in the described probe assembly will be apparent to those skilled in the art from the foregoing description which do not depart from the spirit of the invention. For this reason, these changes are desired to be included within the scope of the appended claims. The appended claims define the present invention; the foregoing description is to be employed for setting forth the present embodiments as illustrative in nature.

What is claimed is:

1. A probe body for a corrosion test probe assembly comprising:
   a. a metallic pipe plug with a top portion of a polygonal configuration and a lower cylindrical portion having a threaded exterior side surface;
   b. said plug having a cavity formed therein which extends through the top portion to adjacent the lower portion;
   c. paralleled passageways extending through the bottom portion of said plug into communication with said cavity;
   d. an insulating member secured within each of said passageways and a metallic terminal pin extending centrally through each of said insulating members,
   e. a multiconnector electrical fitting secured to the top portion of said plug for enclosing said cavity;
   f. electrically conductive means within said cavity interconnecting the pins to said electrical fitting, and means to insulate said conductive means from each other and said plug; and
   g. each of said pins extending from said insulating members exteriorly of said plug carrying a threaded portion whereby an electrode may be releasably secured to each pin and with fluid seal means engaged in fluidtightness between presented end surfaces of said insulating members and electrodes.

2. The probe body of claim 1 wherein each of said parallel passageways are threaded at least in part, and each of said insulating members carry complementary threads whereby said insulating members are threadedly secured into said passageways.

3. The probe body of claim 2 wherein each of said insulating members is formed of an exteriorly threaded metallic sleeve surrounding in compression a glass element, and each of said terminal pins extends centrally through each of said glass elements and said sleeves, glass elements and pins are sealed into fluidtightness by fusion.

4. The probe body of claim 1 wherein each of said pins extending from said insulating members exteriorly of said plug carries a full diameter cylindrical portion adjacent each of said insulating members, an intermediate threaded portion, and a reduced diameter end portion adaptable to provide an end abutting surface.

5. The probe body of claim 1 wherein said cavity is a cylindrical bore extending from the top portion to adjacent the lower portion of said plug, and each of said passageways is a cylindrical bore provided through the lower portion of the plug into communication with said cavity.

6. The probe body of claim 1 wherein said plug has a plurality of spaced apart threaded openings provided in the top portion for the threaded mounting of said multiconnector electrical fitting to the top of the plug and enclosing said cavity.

7. A probe body for a corrosion test probe assembly comprising:
   a. a metallic pipe plug with a top portion of a polygonal configuration and a lower cylindrical portion having a threaded exterior side surface;
   b. said plug having a cylindrical cavity formed axially thereinto, and said cavity extending through said top portion toward the bottom of said lower portion of said plug;
   c. parallel passageways formed into said plug in spaced apart relationship, each of said passageways extending through the bottom of said lower portion of said plug into communication with said cavity and with continuous solid portions of said plug surrounding said cavity and each of said passageways;

d. each of said passageways being threaded at least in part adjacent their terminus at the bottom of said lower portion of said plug, an insulating member threadedly mounted within each of said passageways in a fluidtight relationship, and each of said insulating members carrying a metallic terminal pin extending centrally therethrough with each insulating member having an end presented surface adaptable to provide a fluid seal means about said pins and each of said terminal pins adapted to receive an electrode extending exteriorly of said plug;

e. said plug having a plurality of spaced apart threaded openings provided into said top portion, a multiconnector electrical fitting threadedly mounted in said openings to the top portion of said plug and enclosing said cavity;

f. said cavity and passageways having sufficient dimensions to accommodate insulated electrical conductive means within said plug employed for interconnecting said terminal pins and electrical fitting; and g. said passageways being aligned in said plug whereby electrodes mounted upon terminal pins in said insulating members extend perpendicularly away from the bottom of said lower portion in parallel spaced apart relationship.

8. The probe body of claim 7 wherein each said insulating member is formed of an exteriorly threaded metallic sleeve surrounding in compression a glass element, and each of said terminal pins extends centrally through each of said glass elements, and said sleeves, glass elements and pins are sealed into fluidtightness by fusion.

9. The probe body of claim 8 wherein each of said pins extending from said insulating members exteriorly of said plug carries a full diameter cylindrical portion adjacent each of said insulating members, an intermediate threaded portion, and a reduced diameter end portion adaptable to provide an end abutting surface.

10. A probe body for a corrosion test probe assembly comprising;

a. a metallic probe body having the form of a pipe plug with a top portion of a polygonal configuration and a lower cylindrical portion having a threaded exterior side surface;

b. said plug having a cylindrical cavity formed axially thereinto, and said cavity extending through said top portion toward the bottom of said lower portion of said plug;

c. parallel passageways formed into said plug in spaced apart relationship, said passageways extending through the bottom of said lower portion of said plug into communication with said cavity and with continuous solid portions of said plug surrounding said cavity and passageways;

d. said passageways being threaded at least in part adjacent their terminus at the bottom of said lower portion of said plug for receiving insulating members into threaded mounting within said passageways in a fluidtight relationship and said insulating members being adapted for carrying metallic terminal pins extending centrally therethrough with each insulating member having an end presented surface to receive a fluid seal mounted about said pins;

e. said plug having a plurality of spaced apart threaded openings provided into said top portion for the threaded mounting of a multiconnector electrical fitting to the top portion of said plug and enclosing said cavity;

f. said cavity and passageways having sufficient dimensions to accommodate insulated electrical conductive means within said plug employed for interconnecting the terminal pins and electrical fitting; and g. said passageways being aligned in said plug whereby electrodes threadedly mounted upon terminal pins and sealed to said insulating members by a fluid seal extend perpendicularly away from the bottom of said portion in parallel spaced apart relationship.

* * * * *

UNITED STATES PATENT OFFICE
CERTIFICATE OF CORRECTION

Patent No. 3,639,876      Dated February 1, 1972

Inventor(s) Homer M. Wilson

It is certified that error appears in the above-identified patent and that said Letters Patent are hereby corrected as shown below:

Column 1, line 26, after "as" insert ---in---;

Column 1, line 56, for "The" read ---the---;

Column 2, line 28, cancel "the" first occurrence and substitute therefor ---of---;

Column 4, line 66, for "OO ring" read ---O ring---;

Column 5, lines 36-39, cancel the sentence "The body +++ any threaded joint"; and Column 5, line 64, for "1021" read ---1020---.

Signed and sealed this 1st day of August 1972.

(SEAL)
Attest:

EDWARD M. FLETCHER, JR.      ROBERT GOTTSCHALK
Attesting Officer      Commissioner of Patents